United States Patent [19]

Williams

[11] Patent Number: 5,400,424

[45] Date of Patent: Mar. 21, 1995

[54] MODULE FOR A NON-REFLECTIVE FIBER OPTIC DISPLAY SCREEN

[76] Inventor: Charles M. Williams, 3246 36th Ave., S.W., Seattle, Wash. 98126

[21] Appl. No.: 168,141

[22] Filed: Dec. 17, 1993

[51] Int. Cl.⁶ .............................................. G02B 6/04
[52] U.S. Cl. ...................................... 385/76; 385/15; 385/31; 385/39; 385/77; 385/115; 385/147; 385/901
[58] Field of Search ........................ 385/54, 55, 59, 76, 385/77, 86, 115, 116, 120, 121, 901, 15, 31, 39, 147; 345/30, 32, 33, 55, 176; 385/15, 31, 39, 147

[56] References Cited

U.S. PATENT DOCUMENTS

| | | | |
|---|---|---|---|
| 3,575,675 | 4/1971 | Hirsch | 333/98 |
| 3,772,771 | 11/1973 | Schuttoffel | 29/600 |
| 3,853,658 | 12/1974 | Ney | 385/116 |
| 4,436,366 | 3/1984 | Abramson | 385/31 |
| 4,761,062 | 8/1988 | Loce et al. | 385/116 |
| 5,127,080 | 6/1992 | Duggan, Sr. | 385/120 |
| 5,150,445 | 9/1992 | Toyoda et al. | 385/116 |
| 5,247,600 | 9/1993 | Williams et al. | 385/115 |
| 5,293,437 | 3/1994 | Nixon | 385/115 |

*Primary Examiner*—Frank Gonzalez
*Attorney, Agent, or Firm*—Frank D. Gilliam; John R. Duncan

[57] ABSTRACT

A module for a display screen that includes a plurality of evenly spaced fiber optic light sources along the face of a matrix block having a non-reflecting face. The face of the block has a plurality of generally right conical projections. An optical fiber extends substantially axially through each projection with the fiber end projecting beyond the apex. Slant height lines of the conical projections are curved, so that the sides of the projections are slightly concave or convex, to scatter incident light toward adjacent projections where the light is absorbed. Typically the bases of the conical projections can be hexagonal, with the edges of the block shaped so that a plurality of blocks can be aligned to produce an array of blocks with the projections substantially uniformly spaced across the array. In order to increase the sideways spread of light emitted by the optical fiber ends, the fiber ends are grooved.

14 Claims, 1 Drawing Sheet

MODULE FOR A NON-REFLECTIVE FIBER OPTIC DISPLAY SCREEN

BACKGROUND OF THE INVENTION

This invention relates in general to display screens and, more specifically to a module for use in such screens having fiber optic light sources and a non-reflective surface.

Large display screens of several different types have been developed for use in advertising, sports score boards, large animated displays and the like. Typically, an array of selectively activated light emitting diodes, incandescent lamps, Unex displays, etc. may be used. Other displays use large cathode ray tubes, sometimes with projection systems to enlarge the viewing area.

Cathode ray tube displays are effective in small sizes, but lose resolution and brightness when enlarged. Many other prior displays have relatively large light sources, such as incandescent lamps, so that the display resolution is so low that they are not effective with video displays and other detailed displays.

Many prior displays are not effective in high ambient light environments, where light strikes the display and is reflected toward the viewers reducing contrast and making the display difficult to view. Some technologies are very directional, viewers need to be directly in front of the display, because of rapid light intensity fall-off toward the sides.

Thus, there is a continuing need for display screens having higher resolution, reduced reflection of ambient light and wider viewing areas.

SUMMARY OF THE INVENTION

The above-noted problems, and others are overcome by a non-reflective display screen made up of a plurality of modules constructed in accordance with this invention. It is an object of the display of this invention to improve the resolution of displayed images. Another object is to substantially eliminate reflection of ambient incident light at the display surface by creating a very black background behind the display image. A further object to improve the dispersion of light from a display to enlarge the effective viewing area.

These objects, and others, are accomplished in accordance with this invention by a module comprising a block having a plurality of substantially equally spaced, generally right conical projections across one face, each conical projection having an optical fiber extending axially therethrough and ending just beyond the apex.

For best results, the ends of the optical fibers are grooved to control the direction of the light emitted by the fiber over a selected or desired angle. Preferably, the grooves are V-shaped, closely spaced and are substantially perpendicular to the fiber centerline. The grooves may run vertically for wider side angle viewing or horizontally for wider top-to-bottom viewing.

The edges of the modules are preferably shaped to permit an array of modules to be assembled with all of the projections across the array substantially uniformly spaced. The edges could be simply flat, although cooperating projections, such as male and female hexagonal, circular, etc. projections are preferred.

In right cones, the slant height lines along the cone surface between the edge of the base and the apex are ordinarily straight. In the present device, such straight cone surfaces tend to reflect light in a single direction, tending to reflect more light from the array surface. For optimum light absorption, the slant height lines should be slightly curved, giving the projection sides a curved surface that scatters and diffuses light and reduces reflection from the module face. The slant height lines and resulting cone surfaces may be either concave or convex.

BRIEF DESCRIPTION OF THE DRAWING

Details of the invention, and of certain preferred embodiments thereof, will be further understood upon reference to the drawing, wherein.

DETAILED DESCRIPTION OF PREFERRED EMBODIMENTS

Figure 1:
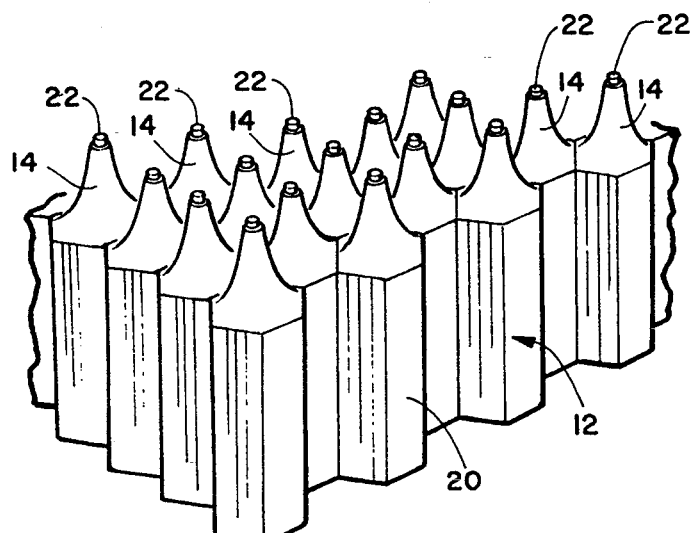
FIG. 1 is a perspective view of a portion of a display module according to this invention.
Figure 2:
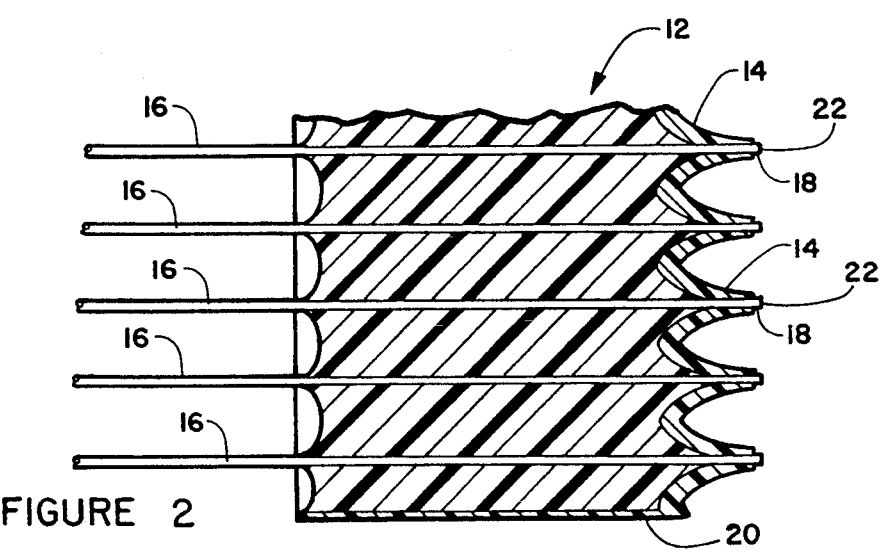
FIG. 2 is a section view through the module, taken on line 2—2 in FIG. 1.

Referring now to FIGS. 1 and 2, there is seen a perspective view of a portion of display module 10. Module 10 basically includes a block 12 having a uniform pattern of conical projections 14 across the upper block surface or face and an optical fiber 16 extending axially through each projection 14 and the block, with an end 18 of each optical fiber 16 extending just above the apex of each projection 14. The second end of the fibers extends to a conventional selective light source. While the face of block 12 bearing projections 14 will usually be flat, convex or concave face surfaces may be used to join and form large concave or convex displays, if desired.

These modules may be used in any suitable display system, typically one in which light is directed through selected fibers, using selected colors of light, to form images across the face of the entire display.

Preferably the edges 20 are configured so that a plurality of modules 10 can be assembled in an abutting arrangement to form a large display array with all optical fibers 16 substantially uniformly spaced. Optimally, the edges 20 have complementary hexagonal, circular, etc. male projections on two sides and female recesses on the other two sides to interlock and aid in assembly of the modules into a large array.

Block 12 may be formed from any suitable material, such as a suitable plastic. Typical plastic materials include rigid cast plastics such as epoxies, polyesters, Nylon, acrylics and the like. Plastics should be selected that do not degrade or damage the fiber materials. Various fillers, such as chopped glass fibers, ultraviolet absorbing agents, etc. may be used to increase strength and durability. Best results are obtained with filled epoxies. While the block may be formed in any suitable way, conventional casting methods are preferred. For example, a mold having the shape of the block may be provided, with depressions for receiving fiber optic ends 18 at the apex of each cavity corresponding to a projection 14. Optical fibers 16 are installed in the mold and liquid resin is flowed thereunto and cured.

Figure 3:
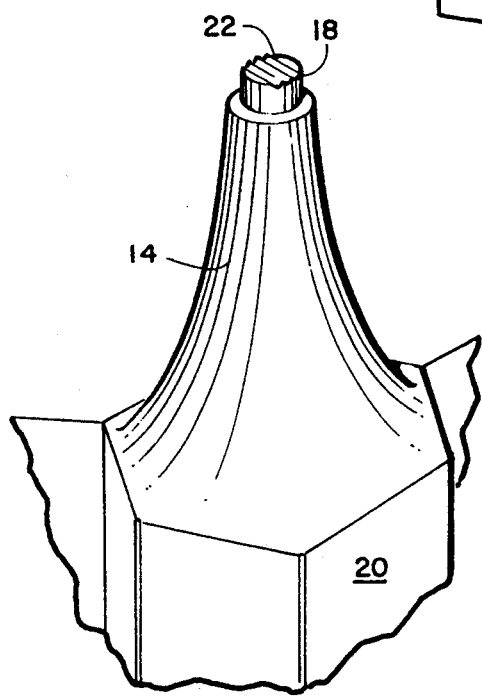
FIG. 3 is a detail perspective view of one of the conic projections making up the module.

FIG. 3 shows, in detail elevation view, a single projection 14. We have found that where the sides of the generally conical projection are straight (that is, slant height lines along the cone sides are straight) incident light directed toward the face of the module is reflected in a single direction, with a large portion reflected back from the module face. With curved slant height lines and the sides of projections 14 either slightly concave or slightly convex, incident light striking the sides of projections 14 is scattered and diffused, and more effectively absorbed by adjacent projections. The result is less light reflected from the module face toward persons viewing the display so that contrast between lighted and dark areas of the display is enhanced.

Any suitable spacing between adjacent fibers may be used. Closer spacing will, in general, be used where the display is designed for close viewing, to improve resolution. Inter-fiber spacings of from about 0.1 to 0.5 inch are preferred for an optimum combination of high resolution and low module cost.

When light is emitted from a fiber 18 having an end 18 that is cut perpendicular to the axis of the fiber, the light emitted by the fiber typically spreads over a cone angle of about 30°, about 15° on each side of the cone axis. The display appears bright to only those viewers directly in front of the display. A spread over at least about 50° on each side of the axis in a selected direction (generally either vertically or horizontally) is desirable for maximum viewing range. We have found that this spread may be accomplished by providing fine grooves 22 across the fiber ends 18, as seen in FIGS. 3 and 4.

While any suitable grooves 22 may be used, closely spaced V-shaped grooves at about 90° to the fiber axis provide optimum light spread. The grooves may be formed in any suitable manner. For example, groups of fibers may be bundled in a tight bundle with the ends in a single plane, then the grooves may be formed with a diamond scribe point or the like moved across the bundle surface to mill grooves into the surface. When the fibers are placed in the mold, the groove pattern will be random, assuring over all uniformity in light spread. Preferably, in order to increase light spread in a specific direction, fibers 16 are embedded in the resin, then the grooves are cut or machined into the exposed fiber ends in a uniform, single direction, to cause uniform light spread in the direction perpendicular to the grooves.

Any suitable optical fiber 16 may be used, either plastic or glass core fibers. While a single fiber is preferred for maximum performance at lowest cost, a fiber bundle may be used, if desired. Typical fibers that may be used are available from Mitsubishi, Poly-Optic Products, Amoco, Gould, Hewlett-Packard and others. The fibers may have any suitable diameter. For best results, fibers having diameters from about 0.01 to 0.06 inch are preferred.

The display module of this invention may be used in any suitable display system. Typical of such systems is that described in our U.S. Pat. No. 5,247,600, granted Sep. 21, 1993.

Other applications, variations and ramifications of this invention will occur to those skilled in the art upon reading this disclosure. Those are intended to be included within the scope of this invention, as defined in the appended claims.

We claim:

1. A module for a non-reflective fiber optic display screen which comprises:

a matrix block having a plurality of substantially equally spaced, generally right conical, projections across one face;

an optical fiber extending through each conic projection axially of each conic projection and having a first end extending beyond each apex and a second end extending beyond the block face opposite said face; and slant height lines drawn from the apex to the base edge of each conic projection being curved.

2. The module according to claim 1 wherein the edges of said block are shaped to permit a plurality of blocks to be aligned in module arrays with projections substantially uniformly spaced across the array.

3. The module according to claim 1 wherein the end of at least some of said ends are grooved.

4. The module according to claim 3 wherein said grooves are approximately V-shaped, closely spaced and lie substantially perpendicular to the fiber centerline.

5. The module according to claim 3 wherein all of said grooves in said fiber ends are grooved with the grooves all being substantially parallel.

6. The module according to claim 1 wherein said curved slant height lines form concave surfaces along said projections.

7. The module according to claim 1 wherein said curved slant height lines form convex surfaces along said projections.

8. A module for a non-reflective fiber optic display screen which comprises:

a generally planar matrix block having a plurality of substantially equally spaced, generally right conical, projections across one face;

an optical fiber extending through each conic projection axially of each conic projection and having an end extending beyond each apex; and the ends of at least some of said fibers being grooved.

9. The module according to claim 8 wherein said grooves are approximately V-shaped, closely spaced and lie substantially perpendicular to the fiber centerline.

10. The module according to claim 8 wherein all of said grooves in said fiber ends are grooved with the grooves all being substantially parallel.

11. The module according to claim 8 wherein slant height lines drawn from the apex to the base edge of each conic projection are curved forming curved surfaces tending to trap light incident on said block face.

12. The module according to claim 11 wherein said curved slant height lines form concave surfaces along at least some of said projections.

13. The module according to claim 12 wherein said curved slant height lines form convex surfaces along at least some of said projections.

14. The module according to claim 8 wherein the edges of said block are shaped to permit a plurality of blocks to be aligned in module arrays with projections substantially uniformly spaced across the array.

* * * * *